United States Patent
Ho et al.

(10) Patent No.: US 12,148,928 B2
(45) Date of Patent: Nov. 19, 2024

(54) METHODS FOR MAKING COMPONENTS OF LEAD-ACID BATTERIES

(71) Applicant: Hammond Group, Inc., Hammond, IN (US)

(72) Inventors: Marvin C. Ho, Crown Point, IN (US); Thomas David Wojcinski, Hammond, IN (US)

(73) Assignee: Hammond Group, Inc., Hammond, IN (US)

( * ) Notice: Subject to any disclaimer, the term of this patent is extended or adjusted under 35 U.S.C. 154(b) by 623 days.

(21) Appl. No.: 17/412,860

(22) Filed: Aug. 26, 2021

(65) Prior Publication Data

US 2022/0069302 A1   Mar. 3, 2022

Related U.S. Application Data

(60) Provisional application No. 63/071,735, filed on Aug. 28, 2020.

(51) Int. Cl.
| | | |
|---|---|---|
| *H01M 4/56* | (2006.01) | |
| *H01M 4/04* | (2006.01) | |
| *H01M 4/58* | (2010.01) | |
| *H01M 10/08* | (2006.01) | |

(52) U.S. Cl.
CPC ........... *H01M 4/56* (2013.01); *H01M 4/0471* (2013.01); *H01M 4/5825* (2013.01); *H01M 10/08* (2013.01); *H01M 2300/0011* (2013.01)

(58) Field of Classification Search
CPC ..................................................... H01M 4/56
See application file for complete search history.

(56) References Cited

U.S. PATENT DOCUMENTS

| | | | |
|---|---|---|---|
| 1,403,462 | A | 1/1922 | Williams |
| 4,197,368 | A | 4/1980 | Davis et al. |
| 4,282,922 | A | 8/1981 | Hartmann |
| 4,317,872 | A | 3/1982 | Varma |
| 4,889,778 | A | 12/1989 | Misra et al. |
| 5,225,298 | A | 7/1993 | Nakayama et al. |

(Continued)

FOREIGN PATENT DOCUMENTS

| | | |
|---|---|---|
| CN | 102468517 A | 5/2012 |
| CN | 103811762 A | 5/2014 |

(Continued)

OTHER PUBLICATIONS

International Search Report and Written Opinion for application PCT/US2021/047724 mail date Jan. 31, 2022 (37 pages).

(Continued)

*Primary Examiner* — Nathanael T Zemui
(74) *Attorney, Agent, or Firm* — Dinsmore & Shohl LLP

(57) ABSTRACT

In one or more embodiment described herein, a precursor of an active material of an electrode of a lead-acid battery may be made by a process that includes forming an active material paste and curing the active material paste to form the precursor of the active material of the electrode of the lead-acid battery. The active material paste may be made by combining at least water, an acid, a glass composition having at least 25 wt. % of a single metal oxide, and lead oxide. The metal oxide may be selected from barium oxide, lead oxide, zinc oxide, or antimony oxide.

16 Claims, 3 Drawing Sheets

(56) References Cited

U.S. PATENT DOCUMENTS

| | | |
|---|---|---|
| 7,501,205 B2 | 3/2009 | Feng et al. |
| 7,642,010 B2 | 1/2010 | Feng et al. |
| 9,379,378 B2 | 6/2016 | Ross et al. |
| 10,050,269 B2 | 8/2018 | Chi et al. |
| 2003/0044683 A1* | 3/2003 | Zguris .................... H01M 4/20 252/182.1 |
| 2005/0003726 A1* | 1/2005 | Zguris .................... C03C 13/00 442/181 |
| 2012/0115031 A1 | 5/2012 | Atanassova et al. |
| 2017/0104199 A1 | 4/2017 | Miller et al. |

FOREIGN PATENT DOCUMENTS

| | | |
|---|---|---|
| CN | 102832414 B | 7/2015 |
| CN | 105226331 A | 1/2016 |
| EP | 3021415 A1 | 5/2016 |
| IN | 102738519 A | 10/2012 |
| JP | H07254409 A | 10/1995 |
| JP | H08167412 A | 6/1996 |
| JP | 2559610 B2 | 12/1996 |
| JP | 3489361 B2 | 1/2004 |
| WO | 0126170 A1 | 4/2001 |
| WO | 2017062053 A1 | 4/2017 |

OTHER PUBLICATIONS

Donmez, K.B., Gençten, M. & Sahin, Y. A performance comparison of protective silicate-coated lead and noncoated lead electrodes in various kind electrolytes of gel valve-regulated lead-acid battery. Ionics 24, 3655-3664 (2018). https://doi.org/10.1007/s11581-018-2551-1.

* cited by examiner

METHODS FOR MAKING COMPONENTS OF LEAD-ACID BATTERIES

CROSS-REFERENCE TO RELATED APPLICATIONS

This application claims priority to U.S. Provisional Patent Application No. 63/071,735, the contents of which are incorporated by reference in their entirety herein.

BACKGROUND

Field

The present disclosure relates to batteries and, more specifically, to lead-acid batteries.

Technical Background

The lead-acid battery is one of the oldest types of rechargeable batteries and can be traced to at least 1859. The ability of the lead-acid battery to supply high surge contents demonstrates that the cells have a relatively large power-to-weight ratio. While the lead-acid battery may have a small energy-to-volume ratio and a very low energy-to-weight ratio, the notable power-to-weight ratio has allowed the lead-acid battery to remain a viable option today.

SUMMARY

Acid stratification and/or active material degradation is an ongoing problem in some conventional lead-acid batteries. Accordingly, there is an ongoing need for batteries with reduced acid stratification and/or active material degradation. It has been found that, according to one or more embodiments presently disclosed, active materials in lead-acid batteries that are formed by particular methods and materials may have improved performance. In particular, in one or more embodiments, a precursor of an active material may be formed utilizing a glass composition comprising at least 25 wt. % of a single metal oxide such as barium oxide, lead oxide, zinc oxide, tin oxide, or antimony oxide.

According to at least one aspect of the present disclosure, a method for forming the precursor of an active material of an electrode of a lead-acid battery includes forming an active material paste by a method comprising combining at least water, an acid, a glass composition comprising at least 25 wt. % of a single metal oxide, and lead oxide. The glass composition may be granular, and the lead oxide may be granular. The metal oxide may be selected from the group consisting of barium oxide, lead oxide, zinc oxide, tin oxide, or antimony oxide. The method may further include curing the active material paste to form the precursor of the active material of the electrode of the lead-acid battery.

According to at least another aspect of the present disclosure, a precursor of an active material of a lead-acid battery may be formed by forming an active material paste by a method comprising combining at least water, an acid, a glass composition comprising at least 25 wt. % of a single metal oxide, and lead oxide. The glass composition may be granular. The lead oxide may be granular. The metal oxide may be selected from the group consisting of barium oxide, lead oxide, zinc oxide, tin oxide, or antimony oxide. The precursor of an active material of a lead-acid battery may further be formed by curing the active material paste to form the precursor of the active material of the electrode of the lead-acid battery.

According to at least another aspect of the present disclosure, a lead-acid battery may include an electrolyte solution, at least one negative plate, and at least one positive plate. One or both of the at least one negative plate or at least one positive plate may include an active material formed from a precursor of an active material. The precursor of the active material may be formed by a process including forming an active material paste by a method comprising combining at least water, an acid, a glass composition comprising at least 25 wt. % of a single metal oxide, and lead oxide. The glass composition may be granular, and the lead oxide may be granular. The metal oxide may be selected from the group consisting of barium oxide, lead oxide, zinc oxide, tin oxide, or antimony oxide. The process may further include curing the active material paste to form the precursor of the active material of the electrode of the lead-acid battery.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure, according to one or more embodiments, is directed to precursors of an active material of an electrode of a lead-acid battery. Additional embodiments described herein include processes for forming precursors of the active material of the electrode of a lead-acid battery. The precursors of the active material of the electrode may be formed into the active material of the electrode.

Figure 1:
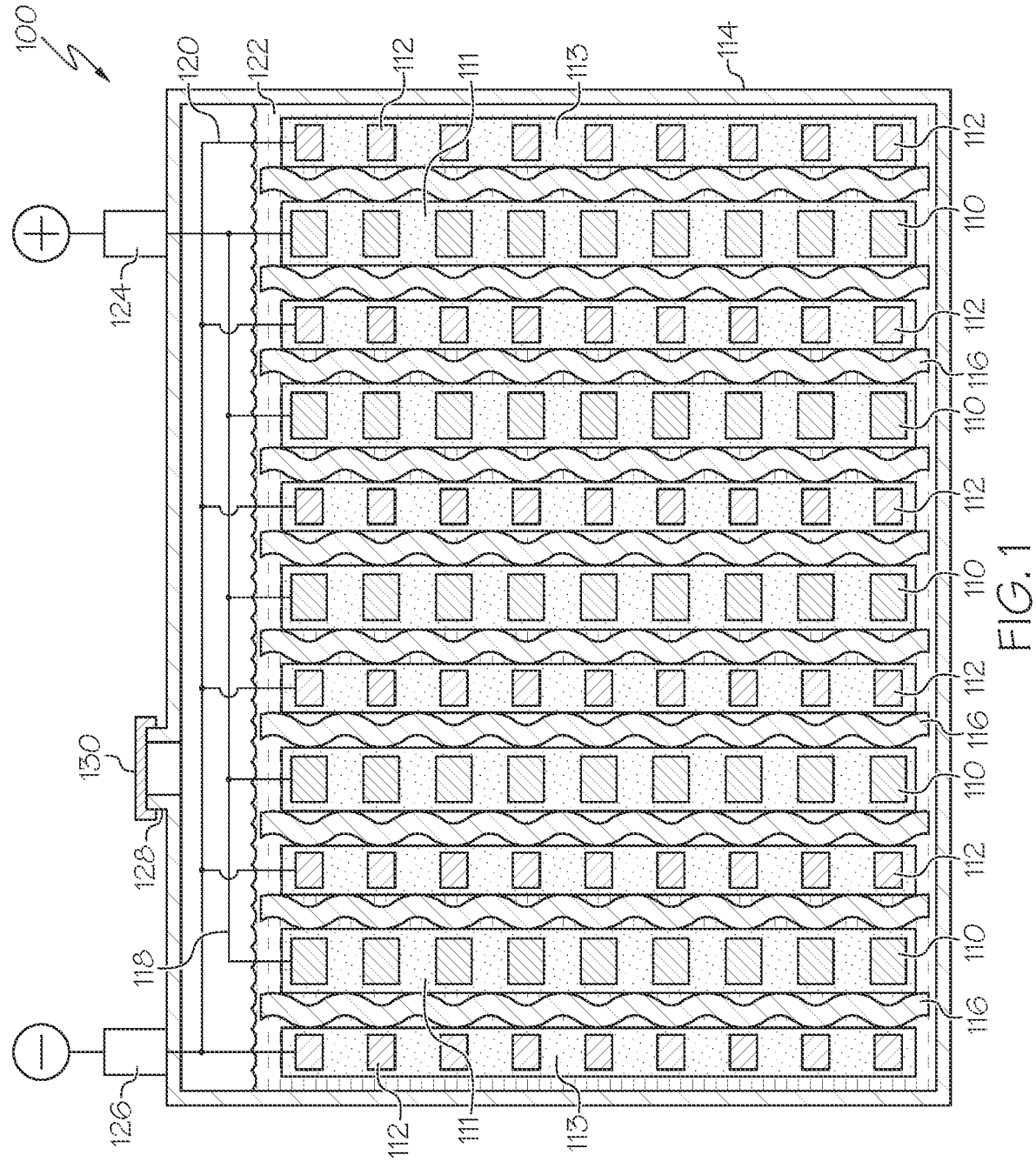
FIG. 1 schematically depicts a cross-sectional view of a lead-acid battery, according to one or more embodiments shown and described in this disclosure.

Referring to FIG. 1, a lead-acid battery 100 may include the following components: a positive terminal post 124, a negative terminal post 126, one or more positive plates 111, one or more negative plates 113, one or more separators 116, an electrolyte solution 122, and a battery case 114.

The positive and negative battery terminal posts 124, 126 may refer to the electrical contacts used to connect a load or a charger to the battery. The positive and negative battery terminal posts 124, 126 may be connected to the positive and negative straps 118, 120, respectively.

The one or more positive plates 111 may include a positive electrode grid 110 that may be coated with a positive active material. Similarly, one or more negative plates 113 may include a negative electrode grid 112 that may be coated with a negative active material. The active materials generally comprise the electrodes of the lead-acid battery 100. The active material may refer to the chemically active component of the electrode. That is, the active material is the component of the electrode which permits the charging and discharging of the lead-acid battery 100. The negative plate 113 is the electrode that is at the lower potential when the circuit is open. The positive plate 111 is the electrode that is at the higher potential when the circuit is open. As used throughout the present disclosure, an "electrode" may refer to an electrical conductor through which electricity enters or leaves the lead-acid battery 100, such as, a plate. The lead-acid battery 100 may include both positive and negative electrodes (i.e., positive and negative plates 111, 113). During discharge, $H^+$ may be produced at the one or more negative plates 113, may move into the electrolyte solution 122, and may then be consumed at the one or more positive plates 111, while $SO_4^{2-}$ ions are consumed at both plates. The reverse may occur during charge. The one or more positive and negative electrodes may primarily be constructed from lead, lead alloy, sponge lead, lead dioxide, lead sulfate.

The one or more separators 116 may separate the one or more positive plates 111 from the one or more negative plates 113 to provide an efficient flow of electrical current. In some embodiments, the separator 116 may be a polymeric membrane that forms a microporous layer, such as a polyethylene material. The separator 116 may ensure the performance of the lead-acid battery 100 remains constant, including the batteries energy and power densities, cycle life, and safety. If the one or more positive plates 111 from the one or more negative plates 113 were not kept separated, the lead-acid battery 100 may short circuit or fail.

The electrolyte solution 122 may typically comprise an acid solution, the acid solution most commonly comprising sulfuric acid. As used throughout the present disclosure, an "electrolyte solution" may refer to a liquid or gel that contains ions and can be decomposed by electrolysis. The electrolyte solution 122 may be a substance that dissociates into ions in solution and acquires the capacity to conduct electricity. A current may be carried by the movement of ions in solution. According to one or more embodiments, the electrolyte solution 122 may comprise water and sulfuric acid. In some embodiments, the electrolyte solution 122 may comprise greater than 10 wt. % sulfuric acid. For example, the electrolyte solution 122 may comprise greater than 15 wt. % sulfuric acid, greater than 20 wt. % sulfuric acid, greater than 25 wt. % sulfuric acid, greater than 30 wt. % sulfuric acid, greater than 35 wt. % sulfuric acid, greater than 40 wt. % sulfuric acid, greater than 45 wt. % sulfuric acid, or greater than 50 wt. % sulfuric acid. It is contemplated that, in some embodiments, other acids may be present in the electrolyte solution 122 as an alternate to sulfuric acid. The electrolyte solution 122 may be an aqueous electrolyte, such that the electrolyte solution 122 contains water as a solvent or medium, or a gelled electrolyte, such that the electrolyte solution 122 is a semi-solid that may have properties ranging from soft and weak to hard and tough. Additionally, the electrolyte solution 122 may be stored in a glass mat, such as in an absorbed glass mat (AGM) type battery.

The battery case 114 may house the one or more positive plates 111, one or more negative plates 113, one or more separators 116, and the electrolyte solution 122. The battery case 114 may comprise a plastic resin such as, for example, polypropylene resin.

To assemble the components of the lead-acid battery 100, the one or more positive plates 111 and the one or more negative plates 113 may be connected to the positive and negative battery terminal posts 124, 126 via the positive and negative straps 118, 120. The positive and negative plates 111, 113 may be arranged in an alternating fashion within a battery case 114, with a plurality of separators 116 between each of the positive and negative plates 111, 113. The plurality of separators 116 may separate each plate from adjacent plates and help prevent short circuits. A positive strap 118 may connect the plurality of positive electrode plates and a negative strap 120 may connect the plurality of negative electrode plates. An electrolyte solution 122 may fill the battery case 114 or the spaces between the positive and negative plates 111, 113 or pores of the positive and negative plates 111, 113. Positive and negative battery terminal posts 124, 126 may extend from the battery case 114 to provide external electrical contact points used for charging and discharging the lead-acid battery 100. Further, the lead-acid battery 100 may include a vent 128 to allow excess gases (e.g., hydrogen, oxygen, etc.) produced during the charge cycle to be vented to atmosphere. A vent cap 130 prevents the electrolyte solution 122 from spilling from the battery case 114.

Once the components of the lead-acid battery 100 are assembled, the lead-acid battery 100 may undergo a formation step in which a charge is applied to the lead-acid battery 100 in order to convert the lead oxide of the positive plates 111 to lead dioxide ($PbO_2$ or lead (IV) oxide) and the lead oxide of the negative plates 113 to lead. In general, as described herein, the pre-charged material that becomes the active materials is referred to as the "precursor of the active material."

After the formation step, the lead-acid battery 100 may be repeatedly discharged and charged. During battery discharge, the positive and negative active materials may react with the sulfuric acid of the electrolyte solution 122 to form lead (II) sulfate ($PbSO_4$). By the reaction of sulfuric acid with the positive and negative active materials, a portion of the sulfuric acid of the electrolyte solution 122 may be consumed. However, the sulfuric acid may be returned to the electrolyte solution 122 during the charging step. The reaction of the positive and negative active materials with the sulfuric acid of the electrolyte solution 122 during discharge may be represented by the following formulae:

Reaction at the Negative Electrode: $Pb_{(s)} + SO_4^{2-}{}_{(aq)} \leftrightarrow PbSO_{4(s)} + 2e^-$ Reaction at the Positive Electrode: $PbO_{2(s)} + SO_4^{2-}{}_{(aq)} + 4H^+ + 2e^- \leftrightarrow PbSO_{4(s)} + 2(H_2O)_{(l)}$ As shown by the above formulae, during discharge, electrical energy is generated. To charge a lead-acid battery 100, the discharge reaction is reversed by applying a voltage from a charging source. During charging, the lead sulfate may react with oxygen molecules of the ionized water in the electrolyte solution 122 to produce lead and lead dioxide. The produced lead dioxide may be deposited on the positive electrode and the produced lead may be deposited on the negative electrode.

In one or more embodiments, the precursor of the active material is formed from an active material paste. As used throughout the present disclosure, an "active material paste" may refer to a paste that is cured to form the precursor of the active material. The positive and negative active material paste may generally comprise at least lead oxide (PbO or lead (II) oxide) and a liquid such as water. Each positive electrode grid 110 may be coated with a positive active material paste as set forth herein, while each negative electrode grid 112 may be coated with a negative active material paste as set forth herein. Following the coating, the active material paste may be cured. Together, a positive or negative electrode grid 110, 112 coated with positive or negative active material paste, respectively, that has been cured, form a positive plate precursor or a negative plate precursor (i.e., an active material precursor). As used throughout the present disclosure, "the positive active material paste" and "the negative active material paste" may be referred to generally as "active material paste."

In one or more embodiments, an active material paste may be formed by combining at least water, an acid, a glass composition comprising at least 25 wt. % of a single metal oxide, and lead oxide. According to one or more embodiments, the metal oxide may be selected from lead oxide, barium oxide, zinc oxide, tin oxide, or antimony oxide.

The method of forming the active material paste will now be described in greater detail. According to one or more embodiments, forming the active material paste may comprise combining the dry ingredients first, such as, the glass composition and the lead oxide, followed by combining the dry ingredients with the wet ingredients, such as, the water and the acid.

As stated above, the active material paste may comprise a glass composition comprising at least 25 wt. % of a single metal oxide. A glass may first be formed or obtained, wherein the glass may generally comprise $SiO_2$ and additional metal oxides. According to some embodiments, a glass generally comprising $SiO_2$ may be reduced to a granular material and combined with a metal oxide. The granular material may then be combined with the metal oxide, heated, and returned to glass form including the metal oxide. Then, the glass including the metal oxide may be again returned to a granular material prior to mixing with the other dry ingredients. According to other embodiments, the glass may be pulverized, milled, crushed, or otherwise processed and then combined with the metal oxide to produce the glass composition. As described herein, according to one or more embodiments, the glass composition may be granular.

The glass composition may comprise at least 25 wt. % of a single metal oxide. For example, the glass composition may comprise at least 27.5 wt. % of a single metal oxide, such as at least 30 wt. %, at least 32.5 wt. %, at least 35 wt. %, at least 37.5 wt. %, at least 40 wt. %, at least 42.5 wt. %, at least 45 wt. %, at least 47.5 wt. %, at least 50 wt. %, at least 52.5 wt. %, at least 55 wt. %, at least 57.5 wt. %, at least 60 wt. %, at least 62.5 wt. %, at least 65 wt. %, at least 67.5 wt. %, or at least 70 wt. % of a single metal oxide. According to one or more embodiments, the metal oxide may be lead oxide, barium oxide, zinc oxide, tin oxide, or antimony oxide. In other embodiments, it is contemplated that alternative metal oxides may be used in place of lead oxide, barium oxide, zinc oxide, tin oxide, or antimony oxide. In embodiments, it is contemplated that multiple metal oxides may be combined. Generally, the remainder of the glass that is not metal oxide may be silica.

According to one or more embodiments, the metal oxide of the glass composition may be a metal silicate. Generally, a silicate may be any member of a family of anions consisting of silicon and oxygen, usually with the general formula $[SiO_{(4-x)}]_n$, where $0 \leq x \leq 2$. Metal silicates refer to glasses that include only silica and a single metal oxide. Such metal silicates may include lead silicate, bismuth silicate, tin silicate, lithium silicate, magnesium silicate, potassium silicate, strontium silicate, calcium silicate, or combinations thereof.

In one or more embodiments, the glass composition may be formed from $SiO_2$ and one or more metal oxides. According to one or more embodiments, the glass composition may be formed by applying heat to melt the components to form a liquid composition. For example, the lead oxide (PbO) and silicon dioxide ($SiO_2$) may be melted and mixed together to form a liquid composition. According to one or more embodiments, as the heated liquid mixture is returned to ambient conditions, a glass may be produced. As such, as described herein, a metal silicate which "comprises" $SiO_2$ and a metal oxide refers to a material which is formed from $SiO_2$ and metal oxide by, for example, melting, where the $SiO_2$ and metal oxide form a mixed, "matrix-like" structure as is commonly understood by those skilled in the art.

As described above, the glass composition may then be pulverized to form a granular from of the glass composition. As used throughout the present disclosure, "granular" may refer to a material comprising a conglomeration of discrete solid, macroscopic particles (or, granules). In embodiments, at least 60.0 wt. % of the granules in the granular form of the glass composition may pass through a size 10 mesh sieve. In embodiments, at least 90.0 wt. % of the granules in the granular form of the glass composition may pass through a size 325 mesh sieve. In some embodiments, at least 90.0 wt. % of the granules in the granular form of the glass composition may have a diameter of less than 325 mesh (or about 45 m).

The metal oxide of the glass may remain inert until after the addition of the wet ingredients, such as, the acid. Following the addition of the wet ingredients, such as the acid, the metal oxide may react with the acid to form various intermediates of lead sulfate, silicic acid, and silica gel. These intermediates (once present in the active material following curing and charging) may absorb a portion of the electrolyte solution 122 and retain it within the active material. This absorption of a portion of the electrolyte solution 122 may provide a reserve of acid within the active material for use during charge and discharge operations and reduce the need for mixing charges.

In some embodiments, the metal oxide may be lead oxide. In one or more embodiments, the lead oxide may be added to the positive active material paste or the negative active material paste. A glass composition comprising lead oxide may comprise PbO and $SiO_2$, as described above. In embodiments, the glass composition may be a lead silicate, such as lead monosilicate, lead bisilicate, or tribasic lead silicate. The glass composition may react with sulfuric acid to form a Si—O—H gel formation within the active material structure of the electrode. The Si—O—H gel formation may retain acid within the active material structure of the electrode. Unlike other applications, where the Si—O—H gel is added to the electrolyte and forms a solid gel outside the active material, the Si—O—H gel formation with the glass composition may be within the active material. This gel formation within the active material may increase the retention of acid within the active material, therefore reducing acid stratification.

In some embodiments, with lead oxide, the formation of Si—O—H gel is slower than the formation of Si—O—H gel when adding silica powders directly to the electrolyte. The slower formation of Si—O—H gel does not alter the rheology of the active material paste, whereas adding silica powders directly to the precursor of the active material paste may undesirably alter the rheology of the active material paste. Further, the addition of lead oxide, which may allow for the formation of lead sulfate, is harmless in the lead-acid battery 100, as lead sulfate is one of the products typical during charging and discharging.

Lead oxide may refer to the group of inorganic compounds with formulas including lead and oxygen. Some common lead oxides may include lead (II) oxide (PbO), lead (II,IV) oxide ($Pb_3O_4$), and lead dioxide ($PbO_2$). Some less common lead oxides may include lead (II,IV) oxide ($Pb_2O_3$) and $Pb_{12}O_{19}$. Additionally, lead oxide may include black lead oxide (a mixture of PbO and fine-powdered metal Pb). According to one or more embodiments, the lead oxide may be granular.

According to one or more embodiments, the glass composition may be a metal silicate having a composition comprising from 40 wt. % to 99 wt. % PbO and from 1.0 wt. % to 60 wt. % $SiO_2$. For example, the glass composition may have a composition comprising from 40 wt. % to 45 wt. %, from 40 wt. % to 50 wt. %, from 40 wt. % to 55 wt. %, from 40 wt. % to 60 wt. %, from 40 wt. % to 65 wt. %, from 40 wt. % to 70 wt. %, from 40 wt. % to 75 wt. %, from 40 wt. % to 80 wt. %, from 40 wt. % to 85 wt. %, from 40 wt. % to 90 wt. %, from 40 wt. % to 95 wt. %, from 45 wt. % to 50 wt. %, from 45 wt. % to 55 wt. %, from 45 wt. % to 60 wt. %, from 45 wt. % to 65 wt. %, from 45 wt. % to 70 wt. %, from 45 wt. % to 75 wt. %, from 45 wt. % to 80 wt. %, from 45 wt. % to 85 wt. %, from 45 wt. % to 90 wt. %, from 45 wt. % to 95 wt. %, from 45 wt. % to 99 wt. %, from 50 wt. % to 55 wt. %, from 50 wt. % to 60 wt. %, from 50 wt. % to 65 wt. %, from 50 wt. % to 70 wt. %, from 50 wt. % to 75 wt. %, from 50 wt. % to 80 wt. %, from 50 wt. % to 85 wt. %, from 50 wt. % to 90 wt. %, from 50 wt. % to 95 wt. %, from 50 wt. % to 99 wt. %, from 55 wt. % to 60 wt. %, from 55 wt. % to 65 wt. %, from 55 wt. % to 70 wt. %, from 55 wt. % to 75 wt. %, from 55 wt. % to 80 wt. %, from 55 wt. % to 85 wt. %, from 55 wt. % to 90 wt. %, from 55 wt. % to 95 wt. %, from 60 wt. % to 99 wt. %, from 60 wt. % to 65 wt. %, from 60 wt. % to 70 wt. %, from 60 wt. % to 75 wt. %, from 60 wt. % to 80 wt. %, from 60 wt. % to 85 wt. %, from 60 wt. % to 90 wt. %, from 60 wt. % to 95 wt. %, from 60 wt. % to 99 wt. %, from 70 wt. % to 70 wt. %, from 70 wt. % to 75 wt. %, from 70 wt. % to 80 wt. %, from 70 wt. % to 85 wt. %, from 70 wt. % to 90 wt. %, from 70 wt. % to 95 wt. %, from 70 wt. % to 99 wt. %, from 75 wt. % to 80 wt. %, from 75 wt. % to 85 wt. %, from 75 wt. % to 90 wt. %, from 75 wt. % to 95 wt. %, from 75 wt. % to 99 wt. %, from 80 wt. % to 85 wt. %, from 80 wt. % to 90 wt. %, from 80 wt. % to 95 wt. %, from 80 wt. % to 99 wt. %, from 85 wt. % to 90 wt. %, from 85 wt. % to 95 wt. %, from 85 wt. % to 99 wt. %, from 90 wt. % to 95 wt. %, from 90 wt. % to 99 wt. %, or from 95 wt. % to 99 wt. % PbO.

In one or more embodiments, t the glass composition may be a metal silicate having a composition comprising from 1 wt. % to 60 wt. % $SiO_2$, from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 1 wt. % to 35 wt. %, from 1 wt. % to 40 wt. %, from 1 wt. % to 45 wt. %, from 1 wt. % to 50 wt. %, from 1 wt. % to 55 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 5 wt. % to 35 wt. %, from 5 wt. % to 40 wt. %, from 5 wt. % to 45 wt. %, from 5 wt. % to 50 wt. %, from 5 wt. % to 55 wt. %, from 5 wt. % to 60 wt. %, from 10 wt. % to 15 wt. %, from 10 wt. % to 20 wt. %, from 10 wt. % to 25 wt. %, from 10 wt. % to 30 wt. %, from 10 wt. % to 35 wt. %, from 10 wt. % to 40 wt. %, from 10 wt. % to 45 wt. %, from 10 wt. % to 50 wt. %, from 10 wt. % to 55 wt. %, from 10 wt. % to 60 wt. %, from 15 wt. % to 20 wt. %, from 15 wt. % to 25 wt. %, from 15 wt. % to 30 wt. %, from 15 wt. % to 35 wt. %, from 15 wt. % to 40 wt. %, from 15 wt. % to 45 wt. %, from 15 wt. % to 50 wt. %, from 15 wt. % to 55 wt. %, from 15 wt. % to 60 wt. %, from 20 wt. % to 25 wt. %, from 20 wt. % to 30 wt. %, from 20 wt. % to 35 wt. %, from 20 wt. % to 40 wt. %, from 20 wt. % to 45 wt. %, from 20 wt. % to 50 wt. %, from 20 wt. % to 55 wt. %, from 20 wt. % to 60 wt. %, from 25 wt. % to 30 wt. %, from 25 wt. % to 35 wt. %, from 25 wt. % to 40 wt. %, from 25 wt. % to 45 wt. %, from 25 wt. % to 50 wt. %, from 25 wt. % to 55 wt. %, from 25 wt. % to 60 wt. %, from 30 wt. % to 35 wt. %, from 30 wt. % to 40 wt. %, from 30 wt. % to 45 wt. %, from 30 wt. % to 50 wt. %, from 30 wt. % to 55 wt. %, from 30 wt. % to 60 wt. %, from 35 wt. % to 40 wt. %, from 35 wt. % to 45 wt. %, from 35 wt. % to 50 wt. %, from 35 wt. % to 55 wt. %, from 35 wt. % to 60 wt. %, from 40 wt. % to 45 wt. %, from 40 wt. % to 50 wt. %, from 40 wt. % to 55 wt. %, from 40 wt. % to 60 wt. %, from 45 wt. % to 50 wt. %, from 45 wt. % to 55 wt. %, from 45 wt. % to 60 wt. %, from 50 wt. % to 55 wt. %, from 50 wt. % to 60 wt. %, or from 55 wt. % to 60 wt. % $SiO_2$.

Lead oxide may cause partial breakage of the direct interconnections of silica tetrahedrons of $SiO_2$, which may be directly connected to each other with oxygen. The partial breakage may result in indirect connection of the silica tetrahedrons via lead ions, which may deteriorate the chemical durability of the glass composition. Thus, the addition of PbO may increase the susceptibility of the silicate to reaction with the acid. When the acid is added to the dry ingredients of the active material paste, the H+ ions of the acid may react with the PbO prior to reacting with the $SiO_2$. It is contemplated that such ranges of PbO may be beneficial, in one or more embodiments, because the acid in the active material paste may allow for an ideal reaction of acid with the $SiO_2$. The greater the percentage of PbO verse $SiO_2$ the faster this reaction with the Si—O bonds may be. Accordingly, the amount of PbO in the glass composition may determine how reactive the modified $SiO_2$ is toward the reaction with the acid.

Pure PbO, without $SiO_2$, would react very quickly with the acid to form lead sulfate. Conversely, pure $SiO_2$, without PbO, would not react with the acid. However, $SiO_3^-$, which may result from the combination of PbO and $SiO_2$, as previously discussed, may react with the acid and quickly form silica sol gel (SiOH). Lead sulfate is a natural product of the chemical reactions which occur when charging and discharging a lead-acid battery 100, whereas silica sol gel may be used to prevent acid stratification and increase acid retention during battery life.

If the amount of PbO is less 40 wt. % or the amount of $SiO_2$ is greater than 60 wt. %, the reaction of the glass composition with the acid may decrease. Therefore, the acid may be less susceptible to react with lower PbO and the amount of silica sol gel may decrease. Conversely, if the amount PbO is greater than 99 wt. %, there may similarly not be sufficient $SiO_2$ in the compound to produce an appreciable amount of acid retaining silica sol gel and the bulk of the product will be lead sulfate.

In some embodiments, the metal oxide may be barium oxide. In one or more embodiments, barium oxide may be useful in the negative active material paste, as barium may poison the positive active material. In such embodiments, the glass composition may comprise BaO and $SiO_2$, as described above. The glass composition may react to form barium sulfate and Si—O—H gel. Barium oxide, therefore, may feature similar advantages to lead oxide, as described above.

In yet other embodiments, the metal oxide may be zinc oxide. In one or more embodiments, the zinc oxide may be added to the positive active material paste or the negative active material paste. In such embodiments, the glass composition may comprise ZnO and $SiO_2$, as described above. The glass composition may react to form zinc sulfate and Si—O—H gel. Zinc oxide, therefore, may feature similar advantages to lead oxide, as described above.

In still other embodiments, the metal oxide may be antimony oxide. In one or more embodiments, antimony oxide may be useful in the positive active material paste, as antimony may poison the negative active material. In such embodiments, the glass composition may comprise $Sb_2O_3$ and $SiO_2$, as described above.

In still other embodiments, the metal oxide may be tin oxide. In one or more embodiments, tin oxide may be useful in the positive active material paste, as tin may poison the negative active material. In such embodiments, the glass composition may comprise $Sn_2O_3$ and $SiO_2$, as described above.

Similar to the metal oxides previously discussed, when adding the acid to the dry materials of the active material paste, antimony oxide and tin oxide may slow the reaction of the acid with the $SiO_2$. That is, the reaction of the acid with the $SiO_2$ may be slowed, as the acid may react with the antimony oxide or tin oxide first, which would be acting to modify the structure of the $SiO_2$. The reaction would yield antimony sulfate or tin sulfate and silica sol gel.

In embodiments where the metal oxide is antimony oxide, it has been observed that antimony oxide may improve the rechargeability and cycle life of the battery. When using an antimony oxide, in addition to the benefits previously discussed, antimony dopants may be present in the active material which may lead to increased cycle life. However, when using an antimony oxide, antimony may migrate to the negative plate 113 over time and cause poisoning of the negative plate 113. This may result in higher water loss which may be destructive to sealed and VRLA style batteries. Therefore, antimony oxide may only be recommended for use in flooded design batteries.

According to one or more embodiments, the glass composition may have a composition comprising from 25 wt. % to 99 wt. % metal oxide. While the wt. % here is directed to lead oxide, it is contemplated that other glass compositions may have a wt. % outside this range.

In one or more embodiments, the glass composition is sufficiently void of sodium oxide. Sodium oxide may be undesirable because it may not sufficiently delay the reaction of the acid with the $SiO_2$ when combing in the dry ingredients with the acid. If the reaction of the acid with the $SiO_2$ is not sufficiently delayed, the precursor may not be processable using conventional means. Additionally, the molar ratio of Na to $SiO_2$ is double that present in, for example, lead oxide so the reaction of $H^+$ ions with the Si—O bonds in hydrolysis may proceed much faster. The fast reaction with the sodium oxide and the acid may render the precursor electrode paste unstable and not able to be processed using conventional means.

The acid used in forming the active material paste may be a chemical substance with the ability to donate a proton or accept an electron pair in reactions. The acid may be able to neutralize alkalis or dissolve metals. The acid used in forming the active material paste may convert some of the lead oxide to basic lead sulfates (i.e., monobasic lead sulfate, tribasic lead sulfate, and tetrabasic lead sulfate) and/or lead sulfate and may form additional lead sulfate compounds during curing and drying. According to one or more embodiments, the acid may comprise sulfuric acid. It is contemplated that, in embodiments, other acids may be used as an alternative to sulfuric acid.

According to one or more embodiments, the glass composition may comprise less than 10 wt. % $Al_2O_3$. For example, the glass composition may comprise less than 9.5 wt. %, less than 9.0 wt. %, less than 8.0 wt. %, less than 7.5 wt. %, less than 7.0 wt. %, less than 6.5 wt. %, less than 6.0 wt. %, less than 5.5 wt. %, less than 5.0 wt. %, less than 4.5 wt. %, less than 4.0 wt. %, less than 3.5 wt. %, less than 3.0 wt. %, less than 2.5 wt. %, less than 2.0 wt. %, less than 1.5 wt. %, less than 1.0 wt. %, or less than 0.5 wt. % $Al_2O_3$. Further, the glass composition may comprise less than 0.1 wt. % $Al_2O_3$. For example, the glass composition may comprise greater than 0.2 wt. %, greater than 0.3 wt. %, greater than 0.4 wt. %, greater than 0.5 wt. %, or greater than 1.0 wt. % $Al_2O_3$. It is contemplated that such ranges may be beneficial, in one or more embodiments, because the $Al_2O_3$ may serve as a stabilizer when preparing the glass composition, as previously described. The $Al_2O_3$ may prevent phase separation in the glass composition during heating. It is contemplated that other stabilizing additives may be used in addition to $Al_2O_3$. Other stabilizing additives may include MgO, CaO, SrO, BaO, $Li_2O$, $Na_2O$, $K_2O$, $Fe_2O_3$, $TiO_2$, $CeO_2$, $ZrO_2$, ZnO, $As_2O_3$, or $Sb_2O_3$.

According to one or more embodiments, the weight ratio of glass composition to lead oxide in the active material paste may range from 1:200 to 1:3.33. For example, the weight ratio of glass composition to lead oxide in the active material paste may range from 1:200 to 1:175, from 1:200 to 1:150, from 1:200 to 1:125, from 1:200 to 1:100, from 1:200 to 1:75, from 1:200 to 1:50, from 1:200 to 1:25, from 1:200 to 1:10, from 1:200 to 1:5, from 1:175 to 1:150, from 1:175 to 1:125, from 1:175 to 1:100, from 1:175 to 1:75, from 1:175 to 1:50, from 1:175 to 1:25, from 1:175 to 1:10, from 1:175 to 1:5, from 1:175 to 1:3.33, from 1:150 to 1:125, from 1:150 to 1:100, from 1:150 to 1:75, from 1:150 to 1:50, from 1:150 to 1:25, from 1:150 to 1:10, from 1:150 to 1:5, from 1:150 to 1:3.33, from 1:125 to 1:100, from 1:125 to 1:75, from 1:125 to 1:50, from 1:125 to 1:25, from 1:125 to 1:10, from 1:125 to 1:5, from 1:125 to 1:3.33, from 1:100 to 1:75, from 1:100 to 1:50, from 1:100 to 1:25, from 1:100 to 1:10, from 1:100 to 1:5, from 1:100 to 1:3.33, from 1:75 to 1:50, from 1:75 to 1:25, from 1:75 to 1:10, from 1:75 to 1:5, from 1:75 to 1:3.33, from 1:50 to 1:25, from 1:50 to 1:10, from 1:50 to 1:5, from 1:50 to 1:3.33, from 1:25 to 1:10, from 1:25 to 1:5, from 1:25 to 1:3.33, from 1:10 to 1:5, from 1:10 to 1:3.33, or from 1:5 to 1:3.33.

According to one or more embodiments, the weight ratio of sulfuric acid to lead oxide in the active material paste may range from 1:100 to 1:10. For example, the weight ratio of sulfuric acid to lead oxide in the active material paste may range from 1:100 to 1:40, from 1:100 to 1:30, from 1:100 to 1:20, from 1:100 to 1:15, from 1:40 to 1:30, from 1:40 to 1:20, from 1:40 to 1:15, from 1:40 to 1:10, 1:30 to 1:20, from 1:30 to 1:15, from 1:30 to 1:10, from 1:20 to 1:15, or from 1:20 to 1:10.

According to one or more embodiments, after forming the active material paste, the active material paste may then be cured to form the precursor of the active material of the electrode. Curing is a process during which a chemical reaction and/or a physical action takes place, resulting in a harder, tougher or more stable linkage or substance. Some curing processes require maintenance of a certain temperature and/or humidity level. Some curing processes may also require maintenance of a certain pressure. However, some curing processes may be performed by mere exposure to ambient conditions.

In embodiments, during the curing of active material paste, lead may oxidize, lead oxide may convert to basic lead sulfates and/or lead sulfate, and lead sulfate and lead oxide may recrystallize. During curing, the positive and negative active material paste and positive electrode grid 110 and negative electrode grid 111 contact may improve while the positive and negative active material paste dries. The curing may result in increased pore volume and surface area as well as a more uniform plate structure. Additionally, the glass composition, as disclosed herein, may increase the production of lead sulfate crystals during the curing process. Not intending to be bound to any particular theory, the glass composition may also produce silica gel structures in the active material paste during the curing process. These silica gel structures may increase the retention of mobile hydronium ions in the electrolyte solution 122 within the pores of the plates. This, in turn, may reduce the mobile hydronium ions in the electrolyte solution 122 and aid in combatting acid stratification. Again, not intending to be bound to any particular theory, the glass composition in the active material paste may increase the overall solubility and ability to absorb acid and water of the active material paste, which may alter the cured active material paste to allow for greater retention of mobile hydronium ions in the electrolyte solution 122. The glass composition may comprise similar properties to silica gel, which may permit the electrode to absorb acid uniformly throughout the lead-acid battery 100, effectively helping to reduce the impact of acid stratification.

According to one or more embodiments, forming the active material paste may further comprise combining fiber with the water, the acid, the glass composition, and the lead oxide. The fiber may comprise a polyester, nylon, or modacrylic fibers. The fiber may increase the mechanical strength of the active material paste and, in turn, the mechanical strength of the active material pasted plate. More specifically, the fiber may reinforce the pasting and prevent cracking of the cured active material paste.

According to one or more embodiments, the method may further comprise contacting the active material paste with an electrode grid prior to the curing of the active material paste. An electrode grid may be a structure to which the formed active material paste is contacted, thereby providing support for the active material paste and aiding in the conductivity of and the formation of the electrode.

As previously described herein, in lead-acid batteries 100, retention of the electrolyte solution 122 within the active material may allow for greater active material utilization. However, through repeated cycling, the electrolyte solution 122 may diffuse from within the active material back into the bulk of the electrolyte solution 122 not within the active material. Such a diffusion of the electrolyte solution 122 from within the active material back into the bulk of the electrolyte solution 122 may result in acid stratification or active material degradation.

Current methods to combat acid stratification in lead-acid batteries 100 may include the introduction of mixing charge steps into the recharge profiles. Such mixing charge steps may involve high current charge steps to produce electrolysis within the lead-acid battery 100 cells. Electrolysis may produce bubbles in the electrolyte solution 122 which may cause the electrolyte solution 122 to mix as the bubbles travel to the surface. Alternatively or additionally, fumed silica may be added to the electrolyte solution 122 to form a gel-type electrolyte solution 122, which may combat acid stratification. In additional embodiments, fumed silica or an AGM separator maybe used to immobilize the H+ ions and reduce or prevent acid stratification.

The precursors of the active material of the electrode of a lead-acid battery 100, as disclosed herein, may reduce acid stratification and/or active material degradation. Active material pastes comprising a glass composition comprising at least 25 wt. % of a single metal oxide as an additive, as described herein, may, once cured and placed in a battery, reduce the mobility of the acidic ions of the electrolyte solution 122. The active material of the electrode of a lead-acid battery 100 from an active material paste comprising a glass composition comprising at least 25 wt. % of a single metal oxide as an additive may absorb a portion of the electrolyte solution 122 and retain it within the active material. This absorption of a portion of the electrolyte solution 122 may provide a reserve of acid within the active material for use during charge and discharge operations and reduce the need for mixing charges. Additionally, the active material of the electrode of a lead-acid battery 100 from an active material paste comprising an additive may provide a seed crystal after the addition of acid to the active material paste mix to encourage the growth of lead sulfate during curing, which may reduce active material degradation.

EXAMPLES

The various embodiments of precursors of an active material of an electrode of a lead-acid battery will be further clarified by the following examples. The examples are illustrative in nature and should not be understood to limit the subject matter of the present disclosure.

Example 1: Lead Silicate

As used in the following examples, a glass composition of lead silicate was mixed with the other raw materials (water, acid, and lead oxide) to form an active material paste. The lead silicate had a density from 6.50 grams per cubic centimeter to 6.65 grams per cubic centimeter and a melting point from 700 degrees Celsius to 784 degrees Celsius. The chemical composition of the lead silicate was 85+/−0.8 wt. % PbO (litharge) and 15+/−0.8 wt. % $SiO_2$. The lead silicate may have further included trace amounts of other elements and compositions, such as, iron oxide, zinc oxide, copper oxide, bismuth oxide, or gold.

Example 2: Preparation of Battery Using Standard Electrode

The active material of the positive and negative electrode was prepared by mixing sulfuric acid, deionized water, leady oxide (PbO and free Pb metal), and organic polymer fiber flock (polyester). The active material of the negative electrode also included expander (a blend of carbon, barium sulfate, and organic lignin).

The starting materials were mixed in a planetary mixer (a Custom Milling & Consulting 1.5 Planetary) in specific ratios to create an active material paste. The positive active material paste was formed by combining 1,000 grams leady oxide, 2 grams fiber flock, 100 grams deionized water, and 100 grams of 1.4 specific gravity sulfuric acid. The negative active material paste was formed by combining 1,000 grams leady oxide, 2 grams fiber flock, 100 grams deionized water, 80 grams of 1.4 specific gravity sulfuric acid, and 10 grams of expander.

To produce the active material pastes, the dry ingredients (leady oxide, fiber flock, and expander) were mixed in the planetary mixer for two minutes. Then, the deionized water was added and the resulting mixture was mixed for an additional two minutes. Finally, the sulfuric acid was added dropwise at a rate of ten grams per minute and then mixed for another three minutes.

The active material paste was then applied to an electrode grid. The electrode grid was a grid of either Pb, Pb—Ca, or Pb—Sb alloy. The active material paste was spread over the electrode grid prior to curing.

In the curing process, the active material spread over the electrode grid was placed in a curing chamber (TPC Lunaire CEO-908-4-B-WFR Chamber). The curing process began by ramping from ambient conditions to 55 degrees Celsius and 95% relative humidity over a period of two hours. The curing chamber was then maintained at 55 degrees Celsius and 95% relative humidity for forty-eight hours to allow for curing. Then, the curing chamber was adjusted to 60 degrees Celsius and 30% relative humidity over a period of six hours to begin drying. The curing chamber was then maintained at 60 degrees Celsius and 30% relative humidity for twenty hours to allow for drying.

Finally, a lead-acid battery was assembled by welding alternating positive and negative plates of cured active material to a connecting strap to form a cell. Polyethylene was placed between the plates to prevent direct contact of the positive and negative active material. The lead-acid battery of Example 2 was a test cell battery with only one positive plate and two negative plates. The test cell was placed in an acrylonitrile butadiene styrene (ABS) plastic case and the electrodes were covered in 1.28 specific gravity sulfuric acid (the electrolyte solution).

Examples 3 and 4: Preparation of Battery with Addition of Lead Silicate

In this example, the preparation of batteries with the lead silicate as an additive of Example 1 is identical to Example 2, but a glass composition of lead silicate was also mixed with the dry ingredients that formed the positive electrode (i.e., leady oxide and fiber flock). In Examples 3 and 4, lead silicate was added in an amount of 1 wt. % and 2 wt. %, respectively, based on the weight of the leady oxide. That is, Example 3 was made in the same manner as Example 2, but with the addition of 10 grams of the lead silicate of Example 1 to the dry ingredient mix that formed the positive electrode. Similarly, Example 4 was made in the same manner as Example 2, but with the addition of 20 grams of the lead silicate of Example 1 to the dry ingredient mix that formed the positive electrode.

Example 5: Comparison of Examples 2-4

The batteries of Examples 2 through 4 were tested using a Maccor Series 4000 JO1370 Battery Testing Unit. Data collected during the first twenty hours of operation was collected and is shown in Table 2. The data was normalized such that Example 2 (No Lead Silicate) is equivalent to 100%.

TABLE 2

| | Example 2 No Lead Silicate | Example 3 1 wt. % Lead Silicate | Example 4 2 wt. % Lead Silicate |
|---|---|---|---|
| Twenty Hour Capacity (Discharge at 0.12 amp) | 100% | 104.5% | 103% |
| Ten Hour Capacity (Discharge at 0.24 amp) | 100% | 104.2% | 103.9% |
| Five Hour Capacity (Discharge at 0.48 amp) | 100% | 105.5% | 105.7% |

The raw collected data values of Example 2 have been normalized, with the raw collected data values for Examples 3 and 4 then being normalized as a percent against the value of the control to show the absolute improvement or detriment of the performance. The presented data shows that after conditioning, the variables containing the glass composition give improvement over the control. While the data has been normalized, Examples 2-4 of Table 2 are measured in amp hours.

Thus, as can be seen from Table 2, Examples 3 and 4 (the addition of lead silicate at 1 wt. % and 2 wt. %, respectively) results in increased capacity of the lead-acid battery during early life.

Figure 2:
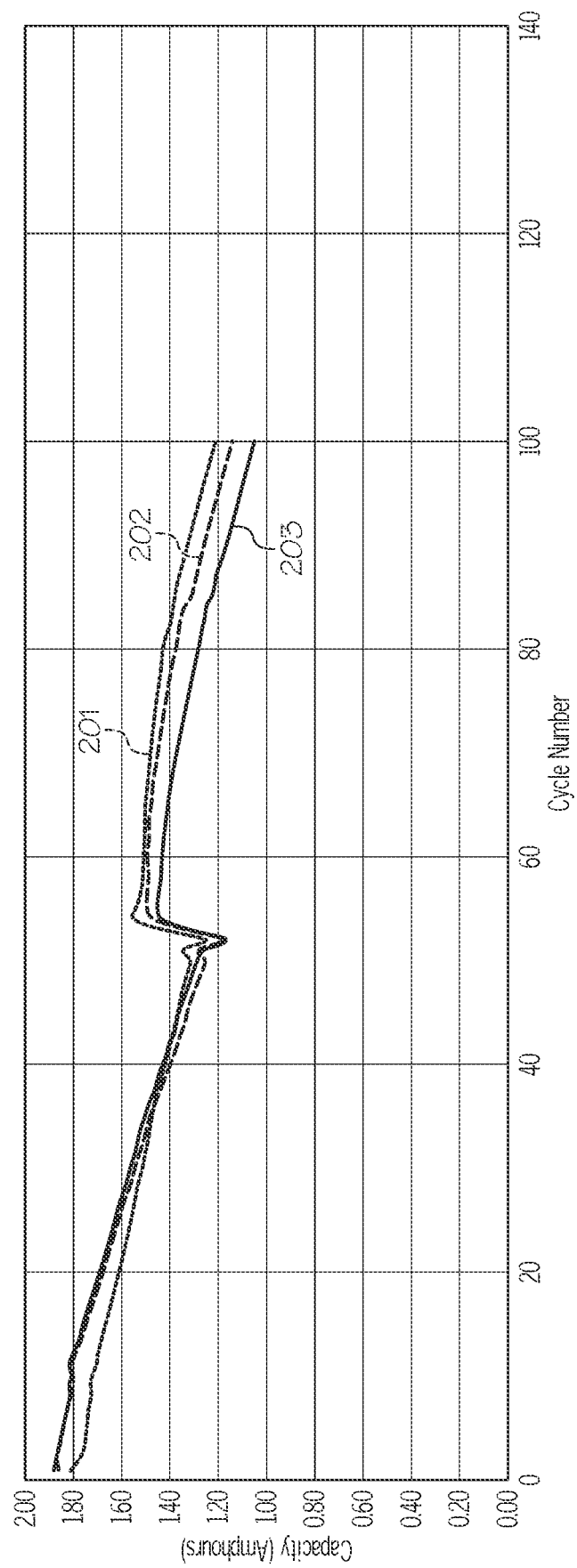
FIG. 2 graphically depicts the relationship between capacity and cycle number while operating a three-hour discharge over a lead-acid battery, according to one or more embodiments shown and described in this disclosure.
Figure 3:
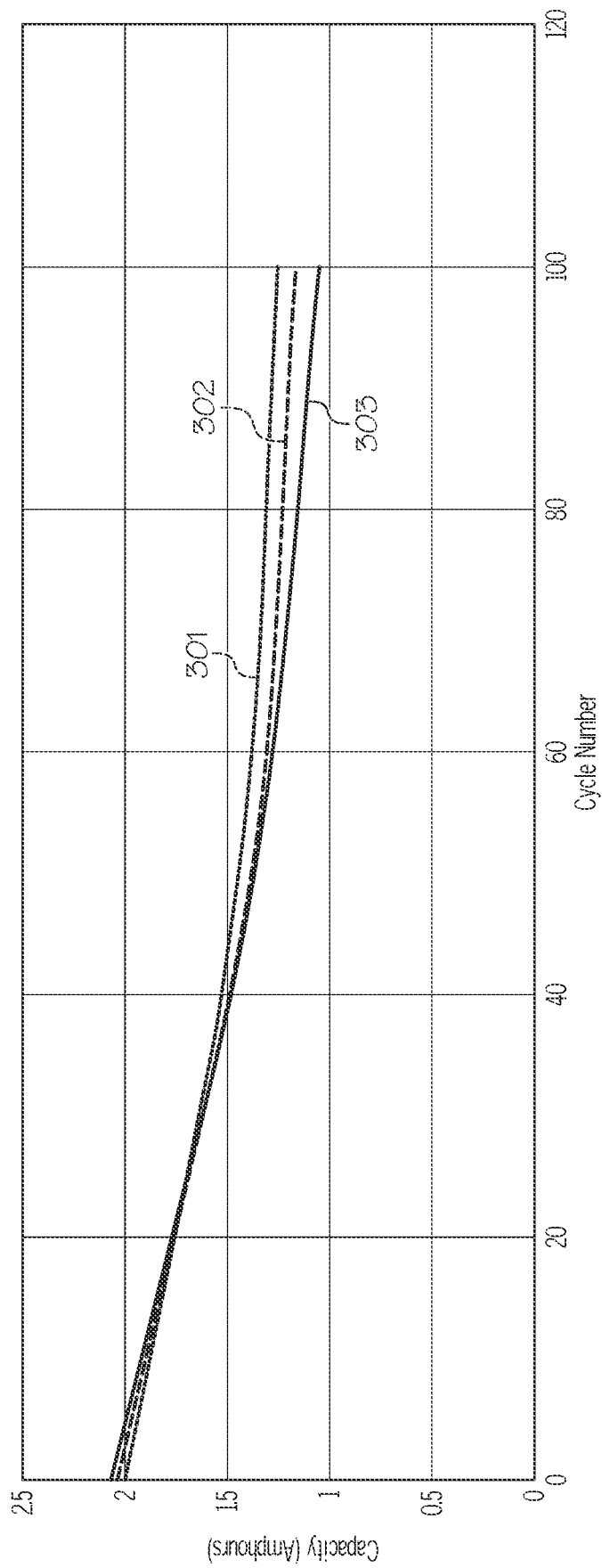
FIG. 3 graphically depicts the relationship between capacity and cycle number while operating a full discharge over a lead-acid battery, according to one or more embodiments shown and described in this disclosure.

Additionally, FIG. 2 and FIG. 3 provide additional evidence that the addition of a glass composition comprising at least 25 wt. % of a single metal oxide offers an increase to capacity of the lead-acid battery during early life. FIG. 2 graphically depicts to a three-hour discharge rate of the battery 200, while FIG. 3 graphically depicts a full discharge of the battery 300. As can be seen in FIG. 2, the batteries with 1 wt. % lead silicate 202 (Example 3) and 2 wt. % lead silicate 203 (Example 4) show an increase in the capacity of the lead-acid battery during early life at a depth of discharge (DOD) at approximately 80% and a three-hour discharge rate over the lead-acid battery without lead silicate 21 (Example 2). Similarly in FIG. 3, the batteries with 1 wt. % lead silicate 302 (Example 3) and 2 wt. % lead silicate 303 (Example 4) show an increase in the capacity of the lead-acid battery during early life at a depth of discharge (DOD) at approximately 80% and at full discharge over the lead-acid battery without lead silicate 301 (Example 2). In both figures, it can be seen that the batteries with 1 wt. % lead silicate 202, 302 (Example 3) and 2 wt. % lead silicate 203, 303 (Example 4) provide an increase in capacity during of the lead-acid battery during early life over the lead-acid battery without a glass composition comprising at least 25 wt. % of a single metal oxide 201, 301 (Example 2), such as in the first twenty to forty cycles of charge and discharge.

Example 6—Preparation of Additional Batteries

Four test groups of batteries were produced and tested. Each battery was a BCI, type 27M with calcium grid alloy and embedded glass mat construction. The test groups were designated A, B, C, and D. Lead silicate was added to the paste of test groups A, B and C, while group D batteries were produced without lead silicate to act as a control. The amount of lead silicate added to group A was 1 wt. %, versus leady oxide, in the positive paste. Group B had 1 wt. % added to the negative paste. Group C had 1 wt. % added to both the positive and negative paste. Table 1 shows a summary of groups A-D.

TABLE 3

| Group | Positive Active Material | Negative Active Material |
|---|---|---|
| A | 1% | 0% |
| B | 0% | 1% |
| C | 1% | 1% |
| D | 0% | 0% |

The remainder of the positive paste was a mixture of leady oxide, tetrabasic lead sulfate seed crystal, sulfuric acid, water, and polyester fibers. The remainder of the negative paste was a mixture of leady oxide, sulfuric acid, water, polyester fibers, and expander, a blend of carbon, lignin, and barium sulfate.

The paste was applied to expanded lead-calcium alloy grids. The paste density was about 4.47 grams per centimeter cubed, had a moisture of about 110%, and the penetration was 2.9 millimeter. This was within the manufacturing standard specifications and consistent with earlier rheology experiments, whereby, it was shown that the paste characteristics are uninfluenced by lead silicate at this loading percent. After the grids were pasted, embedded glass mat paper was applied with rollers on each side of the plate. They were then flash dried through an oven, reducing the moisture to about 10%, before being cured. The plates were cured at >95% relative humidity and a temperature of 85° C. for 9 hours, then held for another 3 hours, at which, they were dried to the manufacture specification. The positive cured plates had an approximate weight of 150 grams, containing a 50-gram grid and 100 grams cured material, while the negative plates weighted 120 grams, containing a 25-gram grid and 95 grams cured material.

Once cured, the plates were assembled into type 27M batteries. Polyethylene separator sleeves were placed on the negative plates and battery elements were stacked in a ratio of eight positives, to seven negatives, per cell. The batteries underwent the rest of assembly using the manufacture's standard procedure. Following this, the fully constructed batteries were filled with 1.4 grams per milliliter sulfuric acid and were formed by electrical charging the batteries to capacity per the manufacturer's specifications.

Example 7—Evaluation of Example 6 Batteries

Prior to electrical testing, the following measurements were taken for each battery: weight, with an average mass of 23 kg; open-circuit voltage with an average of 12.75 volts; and the specific gravity of each cell was recorded, the average specific gravity being about 1.28 grams sulfuric acid per milliliter of electrolyte. There was no discernible difference in the weight of the batteries between the four groups.

Eight of the formed batteries were selected for testing, two from each group. The chosen batteries having the smallest relative specific gravity differences between cells were selected. Holes were drilled in the first and third cell, from the positive cathode, to measure specific gravity just below the surface of the electrolyte and as close to the bottom as possible (approximately 5.5 inches). This was the approximate length of the sampling tube on the digital hydrometer used for measurement. Prior to the mentioned results in FIG. 2, reserve capacity and cold crank testing were performed. The profile for reserve capacity was a 25-amp discharge to less than or equal to 10.5 volts; then, a 20-amp charge to greater than or equal to 15.3 volts; followed by a 5-amp charge for 7 hours or 18 volts. The cold cranking profile was an 800-amp discharge to 6 volts at 0° C. The batteries were then charged to 115 percent plus a 15-ampere-hour boost. Stratification results were taken from the C5, C10, C20, C100 ampere-hour testing in which the batteries were discharged at a current decided by the reserve capacity data for each battery but were about 17 A, 9.7 A, 5.25 A, and 1 A, respectively.

Table 4 is the measured difference in specific gravity between the top and bottom of the cells. The measurement was taken after charging, before the next discharge. Note that stratification was considered to have occurred in the batteries if the difference in specific gravity between top and bottom of the cell was greater than 0.015 (15 points).

TABLE 4

| Batter Sample (from Table 3) | A | B | C | D |
|---|---|---|---|---|
| Acid Stratification after C5* discharge and recharge** (change in S.G. between top and bottom) *** | 0.005 | 0.006 | 0.001 | 0.012 |
| Acid Stratification after C10* discharge and recharge** (change in S.G. between top and bottom) *** | 0.01 | 0.007 | 0.004 | 0.014 |
| Acid Stratification after C20* discharge and recharge** (change in S.G. between top and bottom) *** | 0.013 | 0.008 | 0.002 | 0.022 |
| Acid Stratification after C100* discharge and recharge** (change in S.G. between top and bottom) *** | 0.024 | 0.017 | 0.007 | 0.035 |

*Before discharge, more charging steps were applied to ensure no acid stratification. Specific gravities (top & bottom) were measured before discharge.
**Recharge profile: 115% of discharge energy + 15 Ah (boost charge step).
*** Specific gravity (SG) was measured by digital hydrometer in two cells. The results reported are the averaged value.

During discharge, not much stratification takes place, however, on charging the battery largest disparity in specific gravity can be seen between the top and bottom of the cell. Overcharging the battery is a method of mixing the electrolyte. The data in Table 4 shows the specific gravities measured before discharging. The control battery, from group D, shows acid stratification after the C20 and C100 discharges. The recharging profile of 115% charge returned—15 Ah boost charge is not sufficient to mix the acid well enough in these two cases. These results lead to the acid stratification reduction is as follows: Additive in both positive active material (PAM) and negative active material (NAM)>NAM only>PAM only>Control.

One or more aspects of the present disclosure are described herein. A first aspect of the present disclosure may include a method for forming the precursor of an active material of an electrode of a lead-acid battery, the method comprising: forming an active material paste by a method comprising combining at least water, an acid, a glass composition comprising at least 25 wt. % of a single metal oxide, and lead oxide, wherein the glass composition is granular, wherein the lead oxide is granular, and wherein the metal oxide is selected from the group consisting of: barium oxide; lead oxide; zinc oxide; tin oxide; or antimony oxide; and curing the active material paste to form the precursor of the active material of the electrode of the lead-acid battery.

A second aspect of the present disclosure may include the first aspect, wherein the glass composition is a metal silicate having a composition comprising from 40 wt. % to 99 wt. % PbO and from 1.0 wt. % to 60 wt. % $SiO_2$.

A third aspect of the present disclosure may include the first aspect, wherein the glass composition comprises from 40 wt. % to 99 wt. % PbO, from 1.0 wt. % to 60 wt. % $SiO_2$, from 0.1 wt. % to 10 wt. % $Al_2O_3$.

A fourth aspect of the present disclosure may include any one of the first through third aspects, wherein the acid comprises sulfuric acid.

A fifth aspect of the present disclosure may include any one of the first through fourth aspects, wherein the weight ratio of glass composition to lead oxide in the active material paste ranges from 1:200 to 1:3.33.

A sixth aspect of the present disclosure may include the fourth aspect, wherein the weight ratio of sulfuric acid to lead oxide in the active material paste ranges from 1:100 to 1:10.

A seventh aspect of the present disclosure may include any one of the first through sixth aspects, wherein forming the active material paste further comprises combining fiber with the water, the acid, the glass composition, and the lead oxide.

An eighth aspect of the present disclosure may include any one of the first through seventh aspects, further comprising contacting the active material paste with an electrode grid prior to the curing of the active material paste.

A ninth aspect of the present disclosure may include any one of the first through eighth aspects, wherein the glass composition comprises at least 25 wt. % of barium oxide.

A tenth aspect of the present disclosure may include any one of the first through ninth aspects, wherein the glass composition comprises at least 25 wt. % of lead oxide.

An eleventh aspect of the present disclosure may include any one of the first through tenth aspects, wherein the glass composition comprises at least 25 wt. % of zinc oxide.

A twelfth aspect of the present disclosure may include any one of the first through eleventh aspects, wherein the glass composition comprises at least 25 wt. % of antimony oxide.

A thirteenth aspect of the present disclosure may include any one of the first through twelfth aspects, wherein the glass composition comprises at least 25 wt. % of tin oxide.

A fourteenth aspect of the present disclosure may include precursor of an active material of a lead-acid battery, wherein the precursor is formed by a method comprising: forming an active material paste by a method comprising combining at least water, an acid, a glass composition comprising at least 25 wt. % of a single metal oxide, and lead oxide, wherein the glass composition is granular, wherein the lead oxide is granular, and wherein the metal oxide is selected from the group consisting of: barium oxide; lead oxide; zinc oxide; tin oxide; or antimony oxide; and curing the active material paste to form the precursor of the active material of the electrode of the lead-acid battery.

A fifteenth aspect of the present disclosure may include the fourteenth aspect, wherein the glass composition is a metal silicate comprising from 40 wt. % to 99 wt. % PbO and from 1.0 wt. % to 60 wt. % $SiO_2$, and less than 10 wt. % $Al_2O_3$.

A sixteenth aspect of the present disclosure may include either the fourteenth or fifteenth aspects, wherein the acid comprises sulfuric acid.

A seventeenth aspect of the present disclosure may include any one of the fourteenth through sixteenth aspects, wherein the weight ratio of glass composition to lead oxide in the active material paste ranges from 1:200 to 1:3.33.

An eighteenth aspect of the present disclosure may include the sixteenth aspect, wherein the weight ratio of sulfuric acid to lead oxide in the active material paste ranges from 1:100 to 1:10.

A nineteenth aspect of the present disclosure may include a lead-acid battery, the lead-acid battery comprising: an electrolyte solution; at least one negative plate; and at least one positive plate; wherein: one or both of the at least one negative plate or at least one positive plate comprise an active material formed from a precursor of an active material; the precursor of the active material is formed by a process comprising: forming an active material paste by a method comprising combining at least water, an acid, a glass composition comprising at least 25 wt. % of a single metal oxide, and lead oxide, wherein the glass composition is granular, wherein the lead oxide is granular, and wherein the metal oxide is selected from the group consisting of: barium oxide; lead oxide; zinc oxide; tin oxide; or antimony oxide; and curing the active material paste to form the precursor of the active material of the electrode of the lead-acid battery.

A twentieth aspect of the present disclosure may include the nineteenth aspect, wherein the electrolyte solution comprises water and sulfuric acid.

A twenty-first aspect of the present disclosure may include either the nineteenth or twentieth aspect, wherein the glass composition is a metal silicate comprising from 40 wt. % to 99 wt. % PbO and from 1.0 wt. % to 60 wt. % $SiO_2$.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for forming the precursor of an active material of an electrode of a lead-acid battery, the method comprising:
   forming an active material paste by a method comprising combining at least water, an acid, a glass composition comprising at least 75 wt. % of lead oxide, and lead oxide, wherein the glass composition is granular, and wherein the lead oxide is granular;

curing the active material paste to form the precursor of the active material of the electrode of the lead-acid battery.

2. The method of claim 1, wherein the glass composition is a metal silicate having a composition comprising from 75 wt. % to 99 wt. % PbO and from 1.0 wt. % to 25 wt. % $SiO_2$.

3. The method of claim 1, wherein the glass composition comprises from 75 wt. % to 99 wt. % PbO, from 1.0 wt. % to 25 wt. % $SiO_2$, from 0.1 wt. % to 10 wt. % $Al_2O_3$.

4. The method of claim 1, wherein the acid comprises sulfuric acid.

5. The method of claim 1, wherein the weight ratio of glass composition to lead oxide in the active material paste ranges from 1:200 to 1:3.33.

6. The method of claim 4, wherein the weight ratio of sulfuric acid to lead oxide in the active material paste ranges from 1:100 to 1:10.

7. The method of claim 1, wherein forming the active material paste further comprises combining fiber with the water, the acid, the glass composition, and the lead oxide.

8. The method of claim 1, further comprising contacting the active material paste with an electrode grid prior to the curing of the active material paste.

9. A precursor of an active material of a lead-acid battery, wherein the precursor is formed by a method comprising:

forming an active material paste by a method comprising combining at least water, an acid, a glass composition comprising at least 75 wt. % of lead oxide, and lead oxide, wherein the glass composition is granular, and wherein the lead oxide is granular; and curing the active material paste to form the precursor of the active material of the electrode of the lead-acid battery.

10. The precursor of claim 9, wherein the glass composition is a metal silicate having a composition comprising from 75 wt. % to 99 wt. % PbO and from 1.0 wt. % to 25 wt. % $SiO_2$, and less than 10 wt. % $Al_2O_3$.

11. The precursor of claim 9, wherein the acid comprises sulfuric acid.

12. The precursor of claim 9, wherein the weight ratio of glass composition to lead oxide in the active material paste ranges from 1:200 to 1:3.33.

13. The precursor of claim 11, wherein the weight ratio of sulfuric acid to lead oxide in the active material paste ranges from 1:100 to 1:10.

14. A lead-acid battery, the lead-acid battery comprising:
an electrolyte solution;
at least one negative plate; and
at least one positive plate;
wherein:
one or both of the at least one negative plate or at least one positive plate comprise an active material formed from a precursor of an active material;
the precursor of the active material is formed by a process comprising:
forming an active material paste by a method comprising combining at least water, an acid, a glass composition comprising at least 75 wt. % of lead oxide, and lead oxide, wherein the glass composition is granular, and wherein the lead oxide is granular; and
curing the active material paste to form the precursor of the active material of the electrode of the lead-acid battery.

15. The lead-acid battery of claim 14, wherein one or both of:
the electrolyte solution comprises water and sulfuric acid; or
the glass composition is a metal silicate having a composition comprising from 75 wt. % to 99 wt. % PbO and from 1.0 wt. % to 25 wt. % $SiO_2$.

16. A method for forming the precursor of an active material of an electrode of a lead-acid battery, the method comprising:
forming an active material paste by a method comprising combining at least water, an acid, a glass composition comprising at least 25 wt. % of a single metal oxide, and lead oxide, wherein the glass composition is granular, wherein the lead oxide is granular, and wherein the metal oxide is selected from the group consisting of:
barium oxide;
lead oxide;
zinc oxide;
tin oxide; or
antimony oxide;
curing the active material paste to form the precursor of the active material of the electrode of the lead-acid battery;
wherein one or both of:
the glass composition comprises at least 25 wt. % of zinc oxide; or
the glass composition comprises at least 25 wt. % of antimony oxide.

* * * * *